US012106452B2

(12) United States Patent
Kaethner et al.

(10) Patent No.: US 12,106,452 B2
(45) Date of Patent: Oct. 1, 2024

(54) METHOD FOR NOISE REDUCTION IN AN X-RAY IMAGE, IMAGE PROCESSING APPARATUS, COMPUTER PROGRAM, AND ELECTRONICALLY READABLE DATA STORAGE MEDIUM

(71) Applicant: Siemens Healthcare GmbH, Erlangen (DE)

(72) Inventors: Christian Kaethner, Forchheim (DE); Sai Gokul Hariharan, Forchheim (DE)

(73) Assignee: Siemens Healthineers AG, Forchheim (DE)

( * ) Notice: Subject to any disclaimer, the term of this patent is extended or adjusted under 35 U.S.C. 154(b) by 400 days.

(21) Appl. No.: 17/681,405

(22) Filed: Feb. 25, 2022

(65) Prior Publication Data

US 2022/0277424 A1    Sep. 1, 2022

(30) Foreign Application Priority Data

Feb. 26, 2021   (DE) .................. 10 2021 201 855.6

(51) Int. Cl.
*G06T 5/70*    (2024.01)

(52) U.S. Cl.
CPC ...... *G06T 5/70* (2024.01); *G06T 2207/10116* (2013.01); *G06T 2207/20081* (2013.01); *G06T 2207/20084* (2013.01)

(58) Field of Classification Search
CPC ............ G06T 5/70; G06T 2207/10116; G06T 2207/20081; G06T 2207/20084;
(Continued)

(56) References Cited

U.S. PATENT DOCUMENTS 10,064,591 B2 * 9/2018 Wang .................. A61B 6/4441
10,726,525 B2   7/2020 El-Khamy et al.
(Continued)

FOREIGN PATENT DOCUMENTS

DE   102019207238 A1   11/2020
EP      3435326 A1    1/2019

OTHER PUBLICATIONS

Borges, L. et al., Method for simulating dose reduction in digital breast tomosynthesis, IEEE Trans. Med. Imaging; 36(11):2331-2342, 2017; 12 pp.
Dabov, K. et al., Image denoising by sparse 3-D transform-domain collaborative filtering, IEEE transactions on image processing; vol. 16; Aug. 2007; 16 pp.
(Continued)

*Primary Examiner* — Tom Y Lu
(74) *Attorney, Agent, or Firm* — Lempia Summerfield Katz LLC

(57) ABSTRACT

A method for noise reduction in a low-dose X-ray image includes preprocessing for determining input data, at least one trained function for determining noise-reduced output data from the input data, and postprocessing for determining a result image from the output data. At least one result parameter specifying at least one desired result attribute of the result image is received or determined. The at least one result attribute is obtained by modifying the preprocessing to set a noise value of at least one first noise parameter. The noise value is determined from the result parameter. The noise value may be selected to differ from a reference value of the first noise parameter. Alternatively or additionally, the at least one result attribute is obtained by setting, according to the result parameter, the at least one trained function to one of a plurality of predefined noise values of at least one second noise parameter.

18 Claims, 4 Drawing Sheets

(58) Field of Classification Search
CPC ............. G06T 5/60; G06T 2207/10121; G06T 2207/30004
See application file for complete search history.

(56) References Cited

U.S. PATENT DOCUMENTS

| | | | |
|---|---|---|---|
| 10,832,381 B2* | 11/2020 | Strobel | G06T 5/70 |
| 11,361,431 B2* | 6/2022 | Zaharchuk | G06T 7/0012 |
| 11,727,609 B2* | 8/2023 | Liu | A61B 6/5258 |
| | | | 382/131 |
| 11,844,636 B2* | 12/2023 | Zaharchuk | A61B 6/5205 |
| 2013/0051516 A1* | 2/2013 | Yang | G06T 11/005 |
| | | | 378/4 |
| 2019/0035058 A1 | 1/2019 | Strobel et al. | |
| 2020/0364858 A1 | 11/2020 | Kaethner et al. | |
| 2022/0277424 A1* | 9/2022 | Kaethner | G06T 5/60 |

OTHER PUBLICATIONS

Hariharan et al., Learning-Based X-Ray Image Denoising Utilizing Model-Based Image Simulations, Medical Image Computing and Computer Assisted Intervention—MICCAI, Oct. 2019; 10 pp.

Hariharan, S.G. et al., An analytical approach for the simulation of realistic low-dose fluoroscopic images, International Journal of Computer Assisted Radiology and Surgery; 2019; 10 pp.

Lanczos, C. et al., Fourier analysis of random sequences, Computers & Mathematics with Applications; vol. 1, 1975; 8 pp.

Lehtinen, J. et al., Noise2Noise: Learning Image Restoration without Clean Data, Proceedings of the 35th International Conference on Machine Learning, 2018; 12 pp.

Zhang, Kai et al., Beyond a Gaussian Denoiser: Residual Learning of Deep CNN for Image Denoising, IEEE Transactions on Image Processing; Aug. 2016; DOI: 10.1109/TIP.2017.2662206; https://arxiv.org/pdf/1608.03981.pdf; 13 pp.

* cited by examiner

METHOD FOR NOISE REDUCTION IN AN X-RAY IMAGE, IMAGE PROCESSING APPARATUS, COMPUTER PROGRAM, AND ELECTRONICALLY READABLE DATA STORAGE MEDIUM

This application claims the benefit of Germany Patent Application No. DE 10 2021 201 855.6, filed on Feb. 26, 2021, which is hereby incorporated by reference in its entirety.

BACKGROUND

The present embodiments relate to noise reduction in a low-dose X-ray image, acquired using a lower dose than a reference dose.

X-ray imaging is commonly used for monitoring medical procedures (e.g., minimally invasive interventions). Fluoroscopy, as it is known, is the most familiar instance of this. Especially for the more complex medical procedures, which take longer for example, the exposure of the patient and (over time) of the medical personnel to radiation is no longer negligible. In order to reduce the radiation exposure (e.g., the X-ray dose) and thus also to reduce the risk of potentially correlated health consequences, it has been proposed to work at lower X-ray doses and thereby minimize the dose for the patient and for the medical personnel. For example, the applied X-ray dose should be as low as reasonably possible while maintaining the necessary image quality.

Reducing the X-ray dose in an X-ray guided medical procedure results in an increase in noise, however, and hence to a reduction in the signal-to-noise ratio (SNR) and the image quality. Image processing algorithms (e.g., noise reduction algorithms) that may be inserted in the image processing chain after the image readout have been suggested in this context. The term "denoising" is commonly used for the noise reduction process.

Numerous different approaches to noise reduction in low-dose X-ray images have already been suggested in the prior art. For example, an article by K. Dabov et al., "Image Denoising by Sparse 3-D Transform-domain Collaborative Filtering", IEEE Trans. Image Process. 16(8), pages 2080-2095, 2007, describes a filtering approach. Although such approaches deliver satisfactory results for standard doses or reference doses as employed for typical imaging, such approaches often founder when dose levels are extremely low.

Methods based on artificial intelligence (e.g., machine learning) have proved promising when either acquired pairs of registered low-dose and high-dose images or simulated pairs of noisy images are used in the training stage. Approaches that are unrelated to X-ray imaging may be found, for example, in the article by K. Zhang et al., "Beyond a Gaussian Denoiser: Residual Learning of Deep CNN for Image Denoising", IEEE Trans. Image Process. 26 (7), pages 3142-3155, 2017, and the article by J. Lehtinen et al., "Noise2Noise: Learning Image Restoration without Clean Data", PMLR 80, pages 2965-2974, 2018. As regards denoising of X-ray images, reference should be made, for example, to the article by S. G. Hariharan et al., "Learning-Based X-Ray Image Denoising Utilizing Model-Based Image Simulations", MICCAI 2019, pages 549-557, 2019. Although such noise reduction techniques outperform conventional noise reduction routes when applied, it is not possible using this type of artificial intelligence approach to influence the result in a reliable and robust (e.g., controllable) manner.

Thus, for example, DE 10 2019 207 238 A1 proposes using a generative adversarial network (GAN), where the input data may include an input image dataset and a result image parameter. The result image parameter is intended to relate to an attribute of a result image dataset to be obtained. In other words, the intention is to use a GAN to be able to generate a result image dataset that has a predefined image impression. For example, here, the result image parameter may also include the noise level of the result image dataset. When a GAN is employed with at least one additional item of input data, however, the actual processes are incomprehensible, and it is not possible to control the mechanism by which the noise level is fixed at a certain value, or to what extent structures may arise that represent merely artifacts.

SUMMARY AND DESCRIPTION

The scope of the present invention is defined solely by the appended claims and is not affected to any degree by the statements within this summary.

The present embodiments may obviate one or more of the drawbacks or limitations in the related art. For example, a facility for controllable noise reduction in X-ray images that is more comprehensible, more robust, and more reliable by virtue of a physically-based approach is provided.

In a method according to the present embodiments, at least one result parameter specifying at least one desired result attribute of the result image that is to be achieved by the noise reduction is received or determined-. The at least one result attribute is obtained by modifying the preprocessing in order to set a noise value of at least one first noise parameter that specifies a first noise attribute. The noise value is determined from one or more of the at least one result parameter. The noise value may be selected to differ (e.g., differs) from a reference value of the first noise parameter that specifies a first noise attribute defined for the training data for training the trained function. Alternatively or additionally, the at least one result attribute is obtained by setting, according to one or more of the at least one result parameters, the at least one trained function to one predefined noise value of a plurality of predefined noise values of at least one second noise parameter that specifies a second noise attribute, that were set for training data used to train the function. The noise value of the second noise parameter for setting the trained function may be selected (e.g., is selected) to differ from a noise value of the second noise parameter that prevails in the X-ray image.

The approach provided here achieves an improvement over the limitations and disadvantages of current noise reduction approaches based on deep learning, and provides a physics-based route to controlling the strength of the noise reduction and, if applicable, other noise reduction attributes. The approach is based on using correlated noise together with noise adjustments in the preprocessing (e.g., noise variance stabilization (NVS) during the training and application stage). In other words, a fundamental idea of the present embodiments is to think of noise not just as an objective of the noise reduction algorithm in the sense of achieving reduction of the noise, but to employ noise actively as a regularizing component for regularizing the output from the trained function by diverging (e.g., in a physically-targeted manner and hence with a predictable outcome) from a preset used in the training and/or from an attribute of the X-ray image when setting the trained function.

If a trained function (e.g., a neural network as described in the articles by J. Lehtinen and S. G. Hariharan cited above) is trained solely based on noise having specific noise attributes (e.g., solely having a defined standard deviation and correlation), then the trained function also learns to remove or to reduce in the expected manner solely noise having these defined (or possibly similar) noise attributes. For example, if, during a training stage, all the input images of the input data have noise of unity variance (e.g., after applying noise variance stabilization), the trained function (e.g., the neural network) learns a set of functions/weights for representing these input images, and the activation functions (e.g., a rectified linear unit (ReLU)) work based on the unity variance (e.g., by thresholding).

Based on the characteristic feature of such trained functions (e.g., to be tailored to a characteristic type of noise), the present embodiments provide two physically-motivated approaches to controlling the effect of the trained function (e.g., the strength of the noise reduction) during the application of the trained function. The two physically-motivated approaches are based on broader use of these characteristic noise attributes (e.g., are based on diverging in a targeted manner with a physically-motivated outcome).

In the first variant, with regard to at least one first noise parameter, which specifies a first noise attribute, only a single fixed reference value may be used for the training data; then, this is exploited by determining, in the preprocessing, an input dataset for a noise value that is defined according to the result parameter and differs from this reference value (e.g., for a modified first noise attribute), so that a predictable, different effect of the trained function that leads to the desired result attribute occurs. In other words, when a trained function that was trained using images having the reference value receives input images for which a different noise value is used that differs from the reference value, a correspondingly different result is achieved.

The preprocessing contained in the noise reduction algorithm is normally used to produce specific noise attributes (e.g., to set at least one noise parameter to a specific noise value), while the postprocessing may be used to calculate back to the characteristics of the X-ray image. In this case, the noise parameter is also to be taken into account in the postprocessing. In other words, taking the specific example of setting the first noise parameter, a transform is used in the preprocessing act, whereas the inverse transform (e.g., using the same noise value of the first noise parameter) is then employed in the postprocessing act.

In a second variant, during application, the variation of noise attributes is not modified relative to a fixed reference value of a noise parameter in training, but instead, already in the training stage, a plurality of different predefined noise values are used for at least one second noise parameter, so that different trained functions are produced or the trained function may be parameterized via the second noise parameter in order to obtain different results. For example, this provides the option of setting, in a targeted manner, the trained function to a different noise value of the second noise parameter from that which is actually present in the X-ray image or as a result of the preprocessing, if corresponding result attributes are wanted. It is thereby also possible to work towards these result attributes in a controlled manner. For example, a neural network trained for a lower relative dose with respect to the reference dose than that used to acquire the X-ray image may be selected in order to achieve stronger denoising.

In one embodiment, the at least one result attribute relates to a strength of the noise reduction and/or of a blurring caused by the noise reduction; this will be discussed in greater detail below.

In general, a trained function (e.g., a trained algorithm) models cognitive functions that are associated with thought processes of the human brain. For example, by training based on training data, a trained function may be adjusted to new circumstances, and may detect and extrapolate patterns.

Generally speaking, parameters of a trained function may be adjusted by training (e.g., machine learning). For example, supervised training, semi-supervised training, unsupervised training, reinforcement learning, and/or active learning may be used. Further, representation learning (e.g., feature learning) may be used. For example, the parameters of the trained function are adjusted iteratively by a plurality of training steps.

A trained function may include, for example, a neural network, a support vector machine (SVM), a decision tree, and/or a Bayes network, and/or the trained function may also be based on k-means clustering, Q-learning, genetic algorithms, and/or association rules. For example, the neural network may be a deep neural network, a convolutional neural network (CNN), or a deep CNN.

The trained function does not have to be altered in terms of architecture and/or structure with respect to methods known from the prior art, but instead, the controllability of output is achieved by physically-based modification of input data in application and/or in training (e.g., by adjusting noise attributes at the input to the trained function). For example, architectures such as those described in the articles cited in the introduction by Zhang et al., Lehtinen et al., and Hariharan et al. may be used in the context of the present embodiments. In other words, the approaches known in the prior art may be used here, which avoids the need to give a detailed description of the trained function as part of the present embodiments. In one embodiment, however, the trained function includes a neural network (e.g., a CNN).

In a common area of use of the present embodiments, the noise reduction algorithm is applied to X-ray images used to monitor a medical procedure (e.g., a minimally invasive intervention). Although X-ray images (e.g., diagnostic X-ray images; radiographs) are acquired by X-ray apparatuses using a "standard dose" (SD), which corresponds to the reference dose in the context of the present embodiments, a lower X-ray dose, which differs from the reference dose and also entails greater noise, is employed in order to reduce the dose given to the patient and also to the medical personnel while the medical personnel monitor the medical procedures. Therefore, an objective of the noise reduction measures is often not necessarily to achieve complete removal of the noise, but to generate a result image that corresponds in appearance to an image acquired using the reference dose (e.g., the standard dose (SD)). In other words, in the present embodiments, the result image, at least when the noise value of the first parameter equals the reference value, or the noise value of the second noise parameter equals that of the X-ray image, may be determined to correspond with an image acquired using the reference dose (e.g., exhibits comparable noise characteristics to an image acquired using the reference dose). It is possible, based on the result parameter, to diverge from this in a targeted and robust manner.

With regard to the first variant, according to an embodiment, in order to determine an input image of the input data, a noise variance stabilization transform is implemented in the preprocessing act. The reference value is a reference variance (e.g., a unity variance) of the noise after the noise variance stabilization transform, and a noise variance value of the noise after the noise variance stabilization transform, which differs from the reference variance, is used as the noise value of the first noise parameter. In other words, in this variant, the first noise parameter is the variance of the noise or the first noise attribute of a noise energy. It is therefore provided that the at least one trained function was trained solely using training data for which a noise variance stabilization transform to the reference variance is implemented. Noise variance stabilization (NVS) transforms are already known in the prior art (e.g., see the article by S. G. Hariharan et al. cited in the introduction, that generally use a unity variance (of value 1) as the reference variance). In other words, the reference variance may be a unity variance.

Hence, this embodiment provides employing noise variance stabilization not only for stabilizing the noise variance during both the training and the application stage of the trained function, but using the noise variance stabilization transform in order to control the strength of the noise reduction in the application stage of the trained function. For example, the noise variance stabilization may be based on the generalized Anscombe transform (GAT), as is generally known. Thus, the result attribute may be a strength of the noise reduction, where a noise variance value greater than the reference variance is used for a lower strength of the noise reduction, and a noise variance value less than the reference variance is used for a higher strength of the noise reduction.

It can be provided specifically that the noise variance stabilization is performed according to at least one system parameter of the X-ray apparatus that was used to acquire the X-ray image (e.g., according to the system gain and/or the electronic noise). For the purpose of setting the first noise parameter, one or more of the at least one system parameter (e.g., the system gain) are changed with respect to the value for the X-ray apparatus. For example, the aforementioned generalized Anscombe transform as a specific embodiment of the noise variance stabilization transform uses the system gain and the electronic noise level to stabilize the noise variance to a defined value (e.g., to a unity variance). If now a system gain that is greater than the system gain present during the acquisition of the X-ray image is used during implementation of the GAT-based noise variance stabilization, the noise variance is stabilized to a value lower than the reference variance (e.g., to less than one), and vice versa. Thus, if a trained function that was trained using input images having a reference variance is faced with input images having a different noise variance value (e.g., greater than or less than one, such as by changing the system gain during the use of the noise variance stabilization transform), the result is noise reduction of either lower strength or higher strength. This approach may hence be used to control the strength of the noise reduction of an already trained function.

The second variant of the present embodiments, which does not have to be employed additionally but may also be employed alternatively, rather than employing controlling variation of the noise attributes (e.g., solely) in the application stage, instead is based on controlling variation already for the training data used for training the function. For example, if a trained function was trained using a defined second noise attribute, the expected standard result is achieved if, in the application stage, images are provided that have precisely this second noise attribute (e.g., have the corresponding noise value of the second noise parameter). If, however, the trained function is supplied with input images that differ from the noise value of the second noise parameter used by the training, different, predictable results are achieved. This provides that also as regards the second noise parameter, as will be explained in greater detail using examples, the noise value of the second noise parameter, for the purpose of setting the trained function, may be selected to differ from a noise value of the second noise parameter that prevails in the X-ray image. Control in terms of required result attributes is thereby again possible. Thus, for example, it is possible to select, according to the value obtained for the result parameter, a divergence of the noise value set for the trained function from a noise value that actually prevails in the X-ray image or the input image.

For example, the second noise parameter may be a signal-to-noise ratio and/or at least one characteristic value of a frequency distribution of the noise. In the first case given by way of example, the result attribute is again a strength of the noise reduction, whereas in the second case given by way of example, the result attribute relates to image sharpness and/or edge preservation. For example, if various trained functions are available that have been trained using different signal-to-noise ratios, and if, for example, an X-ray image, or an input image derived therefrom, having a lower signal-to-noise ratio is submitted to a function trained using a higher signal-to-noise ratio, only a certain proportion of the noise is removed, and the rest remains. Stronger noise reduction is achieved when the trained function is presented with images having a higher signal-to-noise ratio.

In a specific embodiment incorporating the training stage, it may be provided for the second variant that for the purpose of training the function (e.g., by simulation) training images are determined from at least one base image (e.g., acquired using the reference dose) for all the predefined noise values of the second noise parameter. Individual trained functions are trained for each noise value of the second noise parameter, or a joint function that uses the second noise parameter as input data is trained for all the noise values. This provides that setting the at least one trained function involves selecting a trained function associated with the desired result parameter using a corresponding noise value of the second noise parameter, or submitting as part of the input data, the noise value of the second noise parameter that is associated with the desired result parameter.

This specific embodiment ultimately makes use of the fact that training images are generated (e.g., by simulation) in order to control the noise attributes of these training images in a specific manner. For example, it may be provided that the training images are determined by simulating the noise for a lower dose than the reference dose by: determining an intermediate image from the base image by scaling according to a dose reduction factor; and adding a noise contribution to the intermediate image in order to obtain the training image.

Such a procedure, in the context of the present embodiments, primarily allows the dose reduction factor to be used as the second noise parameter that specifies the signal-to-noise ratio. In one embodiment, for example, the predefined noise values may be selected such that training images are determined for low doses specifying 10%, 20%, 30% and/or 40% of the reference dose. Thus, in this case, the grayscale values of an X-ray base image acquired using the reference dose (e.g., the standard dose (SD)) are downscaled by the dose reduction factor so that the range in which grayscale values occur matches the grayscale-value range of a corresponding low-dose X-ray image. In order to obtain a realistic low-dose training image, noise components (e.g., different noise components) are then added.

In this context, it may be provided that the noise contribution is determined including a signal-independent component and a signal-dependent component. The signal-dependent component includes a filter specifying the frequency distribution of the noise. A specific implementation for generating (e.g., simulating) such training images is to be presented below in more detail purely by way of example.

Let the grayscale values of the base image be denoted by $y_s$; these are first downscaled by the dose reduction factor d to obtain grayscale values $y_{s \to l}$. Then, in order to obtain a realistic low-dose training image $y_l$ from $y_{s \to l}$, signal-independent and signal-dependent noise is added (see, e.g., the article by L. R. Borges et al., "Method for simulating dose reduction in digital breast tomosynthesis", IEEE Trans. Med. Imaging 36(11), pages 2331-2342, 2017). Specifically, the signal-independent noise may be generated by additive white Gaussian noise (AWGN) $\eta_e[r, c]$ having a standard deviation of $$\sigma_e = \sigma_n \sqrt{1 - \frac{1}{d^2}}$$

and added in the image domain as described in the article by L. R. Borges et al. Since the grayscale values of $y_{s \to l}$ contain noise, the signal-dependent quantum noise may be simulated by filtered AWGN $\eta_q[r, c]$ to be applied after the noise variance stabilization transform, so, for example, in the GAT transform domain (see, e.g., the article by S. G. Hariharan et al., "An analytical approach for the simulation of realistic low-dose fluoroscopic images", Int. J. Comput. Assist. Radiol. Surg. 14, pages 601-610, 2019). The entire process may then be written as:

$$y_l[r, c] = t^{-1}_{\alpha, \frac{\sigma_n}{d}, g}\left(t_{\alpha, \frac{\sigma_n}{d}, g}(y_{s \to l}[r, c]) + \eta_q[r, c]\right) + \eta_e[r, c],$$

where $t(.)$ and $t^{-1}(.)$ are the GAT and the inverse GAT, respectively. According to an article by C. Laczos and B. Gellai, "Fourier analysis of random sequences", Computers & Mathematics with Applications 1(3-4), pages 269-276, 1975, the signal-dependent noise component nq of standard deviation $\sigma_q$ is given by $$\eta_q = (\text{Re}(\mathcal{F}^{-1\,-1}(Q)) + \text{Im}(\mathcal{F}^{-1\,-1}(Q))) \cdot \sigma_q.$$

where $\mathcal{F}^{-1\,-1}$ denotes the inverse Fourier transform. This correlated noise component $Q[u, v]$ is given by $$Q[u,v] = \hat{K}_q[u,v] \times e^{i2\pi\psi[u,v]},$$

where $\psi[u, v]$ is AWGN of unity variance, and $\hat{K}_q[u, v]$ is a filter specifying the frequency distribution. If $y'_{s \to l}$ is used to denote the $y_{s \to l}$ normalized by imaging parameters, the applied GAT makes the noise variance equal to $$\frac{1}{d}.$$

Since a unity variance is expected for the resultant result image, and based on the way in which the filter coefficients are normalized, the following is obtained $$\sigma_q \sqrt{1 - \frac{1}{d}}.$$

Using the filter $\hat{K}_q[u, v]$ allows the use also of filter parameters or filter coefficients as useful second noise parameters so that ultimately a different amount and/or type of noise is added depending on the predefined noise value of the second noise parameter. In other words, in general, when, as presented above, the noise contribution is determined including a signal-independent component and a signal-dependent component, where the signal-dependent component includes a filter specifying the frequency distribution of the noise, it is advantageous to use as the second noise parameter at least one characteristic value of the frequency distribution used by the filter. For example, the bandwidth may be used. In one embodiment, however, the predefined noise values of the second noise parameter that relates to the characteristic value of the frequency distribution are selected to specify high-frequency components in the signal-dependent noise that vary in magnitude.

If the training data contains less high-frequency noise compared with the input data used in the application stage, applying the trained function results in blurring. If the training data contains more high-frequency noise compared with the input data in the application stage, the trained function has the effect of preserving structure. This makes it possible, depending on the content of the X-ray image (e.g., instruments), contrast agent, and/or anatomical structures, to use the noise reduction algorithm to obtain a specific result image, or even to process specific portions of the X-ray image differently in order to preserve structures.

Indeed generally, it may also be provided according to the present embodiments that different values of the result parameter are assigned to different image regions of the X-ray image, with the noise reduction algorithm applied separately for the individual image regions according to the respective values. For example, image regions in which edges are meant to be seen particularly clearly (e.g., in image regions showing a medical instrument) are handled in a manner that preserves structure and/or sharpens edges, whereas anatomical background may be shown rather blurred. In this case, suitable result parameter values and partitions into image regions may be provided at least partly in an automated manner (e.g., using information obtained in the context of a medical procedure). In one embodiment, however, the procedure described may, for example, be used to allow a user (e.g., a doctor) to receive a result image customized to personal requirements. For example, a low-dose X-ray image may be processed by the noise reduction algorithm such that there is a smooth background from which sharp edges have largely been removed, in front of which the emphasized and sharply delimited medical instrument may be seen clearly.

In addition to the method, the present embodiments also relate to an image processing apparatus for noise reduction in a low-dose X-ray image, acquired using a lower dose than a reference dose, using a noise reduction algorithm that includes a preprocessing step for determining input data, at least one trained function for determining noise-reduced output data from the input data, and a postprocessing step for determining a result image from the output data. The image processing apparatus, which may be configured to implement a method according to the present embodiments, includes a first interface for receiving the X-ray image. The image processing apparatus also includes a second interface for receiving at least one result parameter specifying at least one desired result attribute of the result image. The result attribute is to be achieved by the noise reduction. The image processing system also includes a noise reduction unit for determining the result image using the noise reduction algorithm. In order to obtain the at least one result parameter, the noise reduction unit is also configured to modify the preprocessing in order to set a noise value of at least one first noise parameter that specifies a first noise attribute. The noise value is determined from at least one of the at least one result parameters. The noise value may be selected to differ (e.g., differs) from a reference value of the first noise parameter. The reference value specifies a first noise attribute defined for the training data for training the trained function. Alternatively or additionally, the noise reduction unit is configured to set, according to at least one of the at least one result parameters, the at least one trained function to one of a plurality of predefined noise values of at least one second noise parameter that specifies a second noise attribute, that were set for training data used to train the function. The noise value of the second noise parameter for setting the trained function may be selected (e.g., is selected) to differ from a noise value of the second noise parameter that prevails in the X-ray image. The image processing system also includes a third interface for outputting the result image.

All the statements relating to the method according to the present embodiments may be applied analogously to the image processing apparatus according to the present embodiments; therefore, the aforementioned advantages may likewise be achieved by the apparatus. With respect to developments of the method, further function units may be provided in the image processing apparatus. For example, in exemplary embodiments, the image processing apparatus may also include a training unit that may be used to train and thus provide the trained function of the noise reduction algorithm. In order to implement the function units, the image processing apparatus may include at least one processor and at least one storage device.

The image processing apparatus may be part of an X-ray apparatus (e.g., connected) as part of an image processing chain of the X-ray apparatus (e.g., downstream of an image readout unit). For example, the X-ray apparatus may be an X-ray apparatus suitable for use in monitoring a medical procedure (e.g., may be an X-ray apparatus having a C-arm, on which an X-ray source and an X-ray detector are arranged opposite one another). For fluoroscopic images that were acquired for monitoring a medical procedure using a lower dose than the reference dose (e.g., than a standard dose), the image processing apparatus may be used in the image processing chain in order to obtain from low-dose X-ray images, noise-reduced result images having desired result image attributes according to the result parameter. This may be entered, for example, by an input apparatus of the X-ray apparatus; the noise-reduced X-ray image may be output on an output apparatus of the X-ray apparatus (e.g., on a monitoring screen).

A computer program according to the present embodiments may be loaded directly into the memory of an image processing apparatus according to the present embodiments, and includes program means to perform the acts of a method according to the present embodiments when the computer program is executed in the image processing apparatus. The computer program may be stored on an electronically readable data storage medium (e.g., a non-transitory computer-readable storage medium) according to the present embodiments; control information that includes at least one computer program according to the present embodiments is held on the electronically readable data storage medium. When the data storage medium is used in an image processing apparatus, the control information causes this apparatus to perform the acts of a method according to the present embodiments. The electronically readable data storage medium may, for example, be a non-transient data storage medium (e.g., a CD-ROM).

DETAILED DESCRIPTION

FIGS. 1 to 4 show various exemplary embodiments of a method for noise reduction in an X-ray image, in each of which, in different implementations: in the preprocessing, a noise value of a first noise parameter for which a trained function was trained is diverged from; or the trained function is set or selected such that the trained function was trained for a noise value of a second noise parameter other than that actually present in the X-ray image. It is also possible to combine the various approaches in order to improve generally the capability to achieve desired result attributes.

Figure 1:
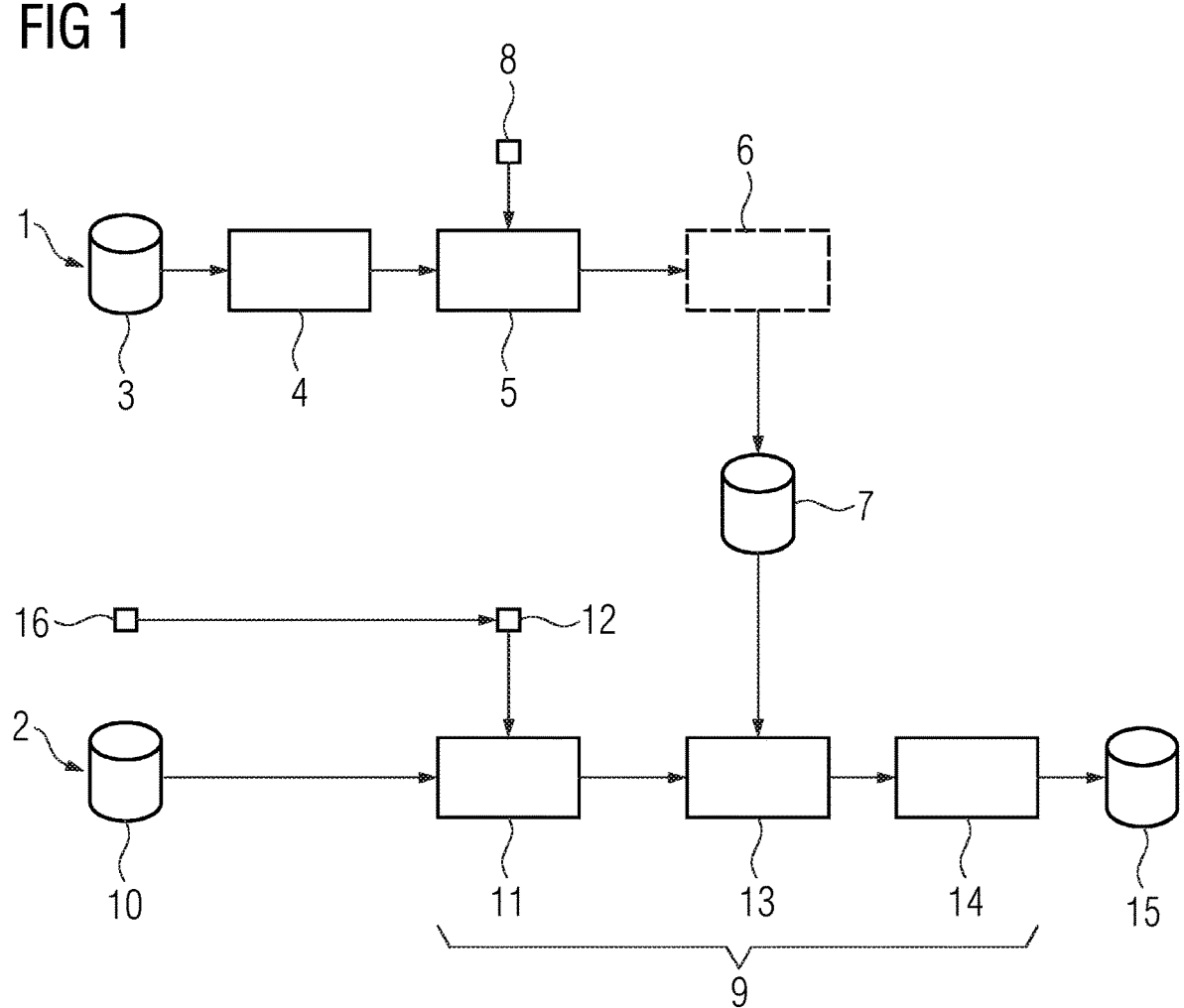
FIG. 1 shows a flow diagram for explaining a first exemplary embodiment of a method.

FIG. 1 illustrates a first exemplary embodiment of the method, in which both a training stage 1 and an application stage 2 are shown for explanatory purposes. In the training stage 1, at least one X-ray base image 3 acquired at a reference dose (e.g., at a standard dose) is used in order to generate therefrom by simulation, in act 4, training images by first downscaling the grayscale values in accordance with a dose reduction factor and then synthetically adding noise. In act 5, a noise variance stabilization transform is applied to the training images, with the result that for the subsequent training (e.g., indicated as a whole by the training act 6), training images having, for example, a fixed reference variance 8 (e.g., a unity variance) are available to a function in order to obtain a trained function 7. This provides that, in the training act 6, only training images that have the reference variance 8 as the reference value are used for a first noise parameter for specifying a first noise attribute. The training function 7 obtained is thus trained for the reference variance 8.

In the application stage 2, noise reduction by a noise reduction algorithm 9 may be applied to a low-dose X-ray image 10, acquired using a lower dose than the reference dose (e.g., to an X-ray image 10 from fluoroscopic monitoring of a medical procedure). The noise reduction algorithm 9 includes a preprocessing act 11, in which the noise variance stabilization transform is applied (e.g., onto a noise variance value 12 (details of which will be given directly)) in order to determine input data to which the trained function 7 is applied in an application act 13. In a postprocessing act 14, the inverse noise variance stabilization transform is then applied to the output data obtained in order to obtain a noise-reduced result image 15.

The noise reduction algorithm 9 receives, together with the X-ray image 10, also a result parameter 16 that specifies a desired result attribute of the result image 15 (e.g., a desired strength of the noise reduction). Hence, the result parameter 16 is used to control the strength of the noise reduction by the noise reduction algorithm 9.

For this purpose, a noise variance value 12 that is generally different from the reference variance 8, to which the variance of the noise, as a first noise parameter, is stabilized in the preprocessing step 11 once again by a generalized Anscombe transform.

In one embodiment, the reference variance is obtained as the noise variance value when this strength of the noise reduction is exactly what is wanted according to the result parameter; the noise variance value, defined by the value of the result parameter 16, may differ from the reference variance in order to control the strength of the noise reduction.

In the present case, the noise variance, which differs from the reference value 8, is achieved by changing the system gain. This is because the noise variance stabilization transform is implemented as a generalized Anscombe transform, which uses the system gain and the electronic noise level to stabilize the noise to a defined noise variance value. If now a system gain is used that is higher than was the system gain for acquiring the X-ray image 10, a lower noise variance value 12 results, and vice versa. Since the trained function 7 was trained to the reference variance 8, however, it holds that when using a higher or lower noise variance value 12, a respectively lower or higher strength of the noise reduction occurs. Thus, it is thereby possible to control the strength of the noise reduction without a change being needed in the training stage 1, and without the trained function 7, or a corresponding application act 13, needing to be changed.

Figure 2:
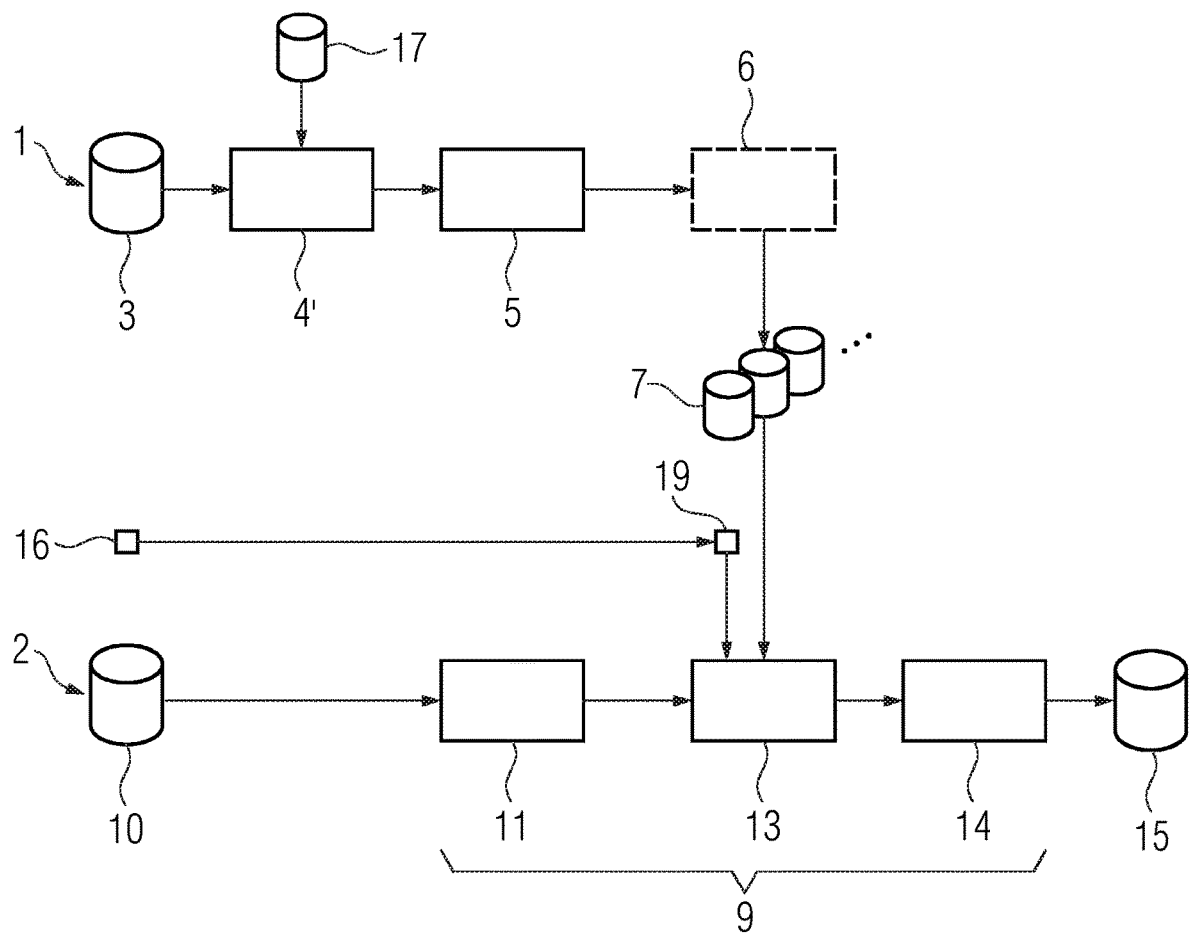
FIG. 2 shows a flow diagram for explaining a second exemplary embodiment of a method.

In the exemplary embodiment shown in FIG. 2, the same reference characters are used to denote functionally equivalent acts and components for the sake of simplicity. In this figure, in the training stage, the simulation act 4' is modified in that training images are generated using different second noise attributes that are specified by second noise parameters, with specific predefined different noise values 17 being defined for the second noise parameters. In the present case, two second noise parameters are considered (e.g., a second noise parameter specifying the signal-to-noise ratio (SNR) and a second noise parameter specifying a characteristic value of a frequency distribution of the noise).

Figure 3:
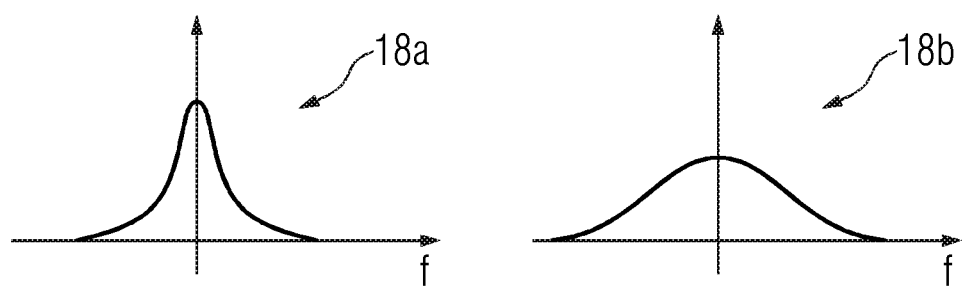
FIG. 3 shows different filters for setting a frequency distribution of a noise.

If a procedure is used as explained in the general part of this description, which is the case in this exemplary embodiment, the dose reduction factor d may be used as the second noise parameter specifying the signal-to-noise ratio (SNR), and a bandwidth of the filter $\hat{K}_q[u, v]$ may be used as the second noise parameter specifying a characteristic value of the frequency distribution. For example, dose reduction factors d may be selected to give rise to training images that correspond to 10% of the reference dose, 20% of the reference dose, 30% of the reference dose, and 40% of the reference dose. FIG. 3 explains the different choice of bandwidth values for the filter core of the filter $\hat{K}_q[u, v]$. In the graph 18a on the left-hand side, a low bandwidth value has been selected, with the result that there are lower noise components at higher frequencies. In the graph 18b on the right-hand side, a higher bandwidth value is selected, with the result that there are higher noise components at higher frequencies.

In the training act 6, after the noise variance stabilization to the unity variance in act 5, functions are trained for all combinations of the predefined noise values 17, resulting in a plurality of trained functions 7. In one embodiment, as an alternative, a single trained function 7 that then receives noise values as the input data in order to select the correct parameterizations may be generated.

In the application stage 2, in this case, two result parameters 16 are obtained in addition to the low-dose X-ray image 10 (e.g., a result parameter specifying the strength of the noise reduction, and a result parameter specifying the blurring attributes, such as indicating the degree to which structures/edges are meant to be preserved). The former of these result parameters 16 relates to, for example, the signal-to-noise ratio and thus to the dose reduction factor d. If for an X-ray image 10 having a certain signal-to-noise ratio, a trained function 7 for a higher signal-to-noise ratio is selected, only a certain proportion of the noise is removed; the strength of the noise reduction falls. If the signal-to-noise ratio for which the trained function 7 was trained is lower than the signal-to-noise ratio of the X-ray image 10, a stronger noise reduction is achievable. In other words, the strength of the noise reduction may be controlled by selecting a trained function 7 using a suitable noise value 19 of the second noise parameter relating to the signal-to-noise ratio compared with the signal-to-noise ratio in the X-ray image 10. For example, if the X-ray image 10 was acquired using 20% of the reference dose, and if the trained function 7 was trained for 30% of the reference dose, this results in weaker denoising.

As regards the second noise parameter that relates to the frequency distribution, a trained function 7 may be selected, for example, for which the training data has more high-frequency noise than the X-ray image 10. This results in structure preservation, whereas in the converse case, stronger blurring of the structures occurs.

Figure 4:
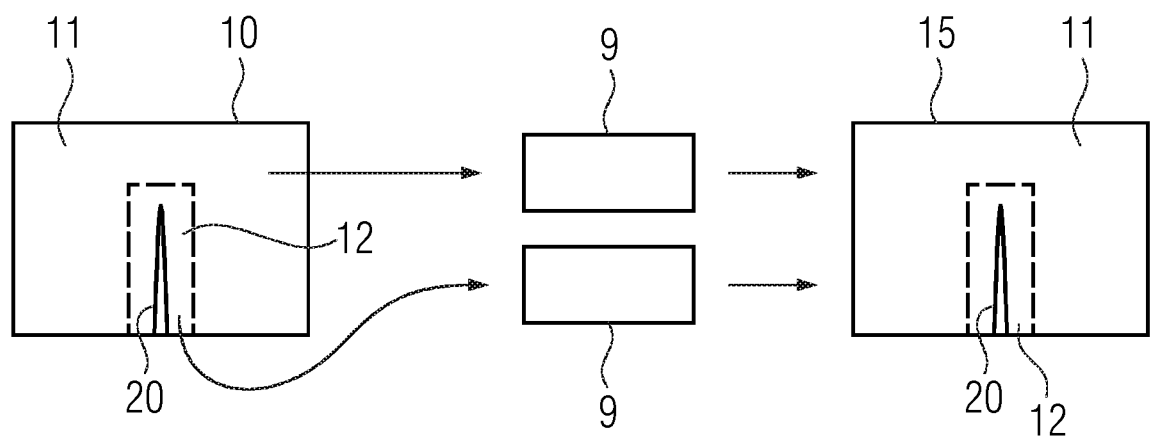
FIG. 4 shows a diagram showing the principle of partitioning an X-ray image.

In one embodiment, as suggested by FIG. 4, the X-ray image 10 may be partitioned into regions 11, 12, to which different result parameters 16 may be assigned, and which therefore are processed by separate, differently parameterized applications of the noise reduction algorithm 9 in order to obtain a result image 15 that has different required result attributes in the different regions 11, 12.

For example, if the region 12 contains a medical instrument 20, this may be emphasized and depicted with sharp edges using structure preservation, whereas the surrounding anatomy may be depicted in a more blurred manner or with smoother transitions.

Figure 5:
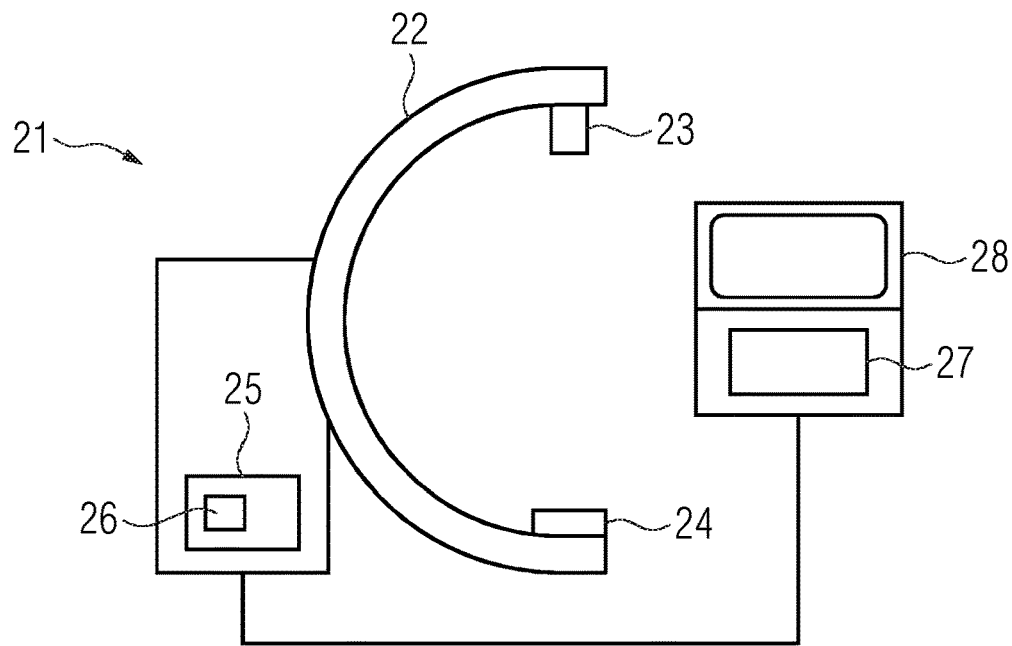
FIG. 5 shows one embodiment of an X-ray apparatus.

FIG. 5 shows a block diagram of an X-ray apparatus 21. The X-ray apparatus 21 has a C-arm 22, on which an X-ray source 23 and an X-ray detector 24 are arranged opposite one another. Projection directions may be set flexibly, making the X-ray apparatus 21 suitable, for example, for acquiring low-dose X-ray images 10 for fluoroscopic monitoring during a medical procedure. The operation of the X-ray apparatus 21 is controlled by a control apparatus 25, which, in the present case, also has an image processing apparatus 26 according to the present embodiments. The image processing apparatus 26 is configured to perform the method according to the present embodiments. The image processing apparatus 26 is arranged as part of an image processing chain for fluoroscopy.

In addition, the X-ray apparatus 21 also includes an input apparatus 27, via which, for example, result parameters 16 may be predefined, and an output apparatus 28 (e.g., a monitoring screen), on which the result images 15 may be displayed.

Figure 6:
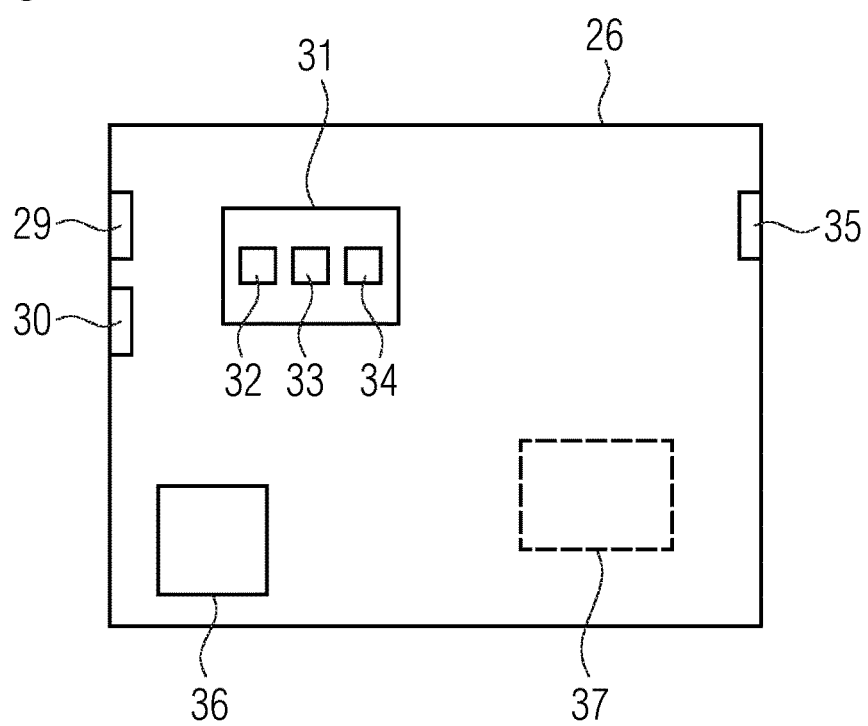
FIG. 6 shows the functional design of one embodiment of an image processing apparatus.

FIG. 6 shows the functional design of an image processing apparatus 26 according to the present embodiments. This primarily includes a first interface 29 for receiving the X-ray images 10, and a second interface 30 for receiving the result parameters 16 (e.g., from the input apparatus 27). In a noise reduction unit 31, the noise reduction algorithm 9 is applied, as described above, for which purpose the noise reduction unit 31 may have a preprocessing unit 32 for implementing the preprocessing act 11, an application unit 33 for implementing the application act 13, and a postprocessing unit 34 for implementing the postprocessing act 14. The result image 15 is provided via a third interface 35.

In addition, the image processing apparatus 26 also includes a storage device 36, in which X-ray image data, the trained function 7, and suchlike may be held. If the image processing apparatus 26 is also meant to perform the functionality in the training stage 1, an appropriate training unit 37 may optionally be present.

Although the invention has been illustrated and described in detail using the exemplary embodiments, the invention is not limited by the disclosed examples, and a person skilled in the art may derive other variations therefrom without departing from the scope of protection of the invention.

The elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent. Such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A method for noise reduction in a low-dose X-ray image, acquired using a lower dose than a reference dose, using a noise reduction algorithm that includes a preprocessing step for determining input data, at least one trained function for determining noise-reduced output data from the input data, and a postprocessing step for determining a result image from the output data, the method comprising:
receiving or determining at least one result parameter specifying at least one desired result attribute of the result image that is to be achieved by the noise reduction; and
obtaining the at least one desired result attribute, obtaining the at least one desired results attribute comprising:
modifying the preprocessing, such that a noise value of at least one first noise parameter is set, the at least one first noise parameter specifying a first noise attribute, the noise value being determined from one or more of the at least one result parameters, wherein the noise value is selectable to differ from a reference value of the at least one first noise parameter, the reference value specifying a first noise attribute defined for the training data for training the trained function;
setting, according to one or more of the at least one result parameters, the at least one trained function to one of a plurality of predefined noise values of at least one second noise parameter that specifies a second noise attribute, that were set for training data used to train the at least one trained function, wherein the one noise value of the at least one second noise parameter for setting the at least one trained function is selectable to differ from a noise value of the at least one second noise parameter that prevails in the low-dose X-ray image.

2. The method of claim 1, further comprising determining an input image of the input data, the determining of the input image of the input data comprising implementing a noise variance stabilization transform in the preprocessing step,
wherein the reference value is a reference variance of noise after the noise variance stabilization transform, and
wherein a noise variance value of the noise after the noise variance stabilization transform is used as the noise value of the at least one first noise parameter, the noise variance differing from the reference variance.

3. The method of claim 2, wherein the reference variance is a unity variance.

4. The method of claim 2, wherein the at least one desired result attribute includes a strength of the noise reduction, and
wherein a noise variance value greater than the reference variance is used for a lower strength of the noise reduction, and a noise variance value less than the reference variance is used for a higher strength of the noise reduction.

5. The method of claim 2, wherein the noise variance stabilization is performed according to at least one system parameter of an X-ray apparatus used to acquire the low-dose X-ray image, and
wherein the method further comprises, for the purpose of setting the at least one first noise parameter, changing one or more of the at least one system parameter with respect to a value of the at least one system parameter for the X-ray apparatus.

6. The method of claim 5, wherein the noise variance stabilization is performed according to the at least one system parameter of the X-ray apparatus used to acquire the low-dose X-ray image according to a system gain, an electronic noise, or the system gain and the electronic noise.

7. The method of claim 1, wherein the at least one second noise parameter is or specifies a signal-to-noise ratio, at least one characteristic value of a frequency distribution of the noise, or the signal-to-noise ratio and the at least one characteristic value of the frequency distribution of the noise.

8. The method of claim 1, further comprising training the at least one function, training the at least one function comprising determining training images from at least one base image for all the predefined noise values of the at least one second noise parameter, and
wherein individual trained functions of the at least one trained function are trained for each noise value of the at least one second noise parameter, or a joint function that uses the at least one second noise parameter as input data is trained for all noise values.

9. The method of claim 8, wherein determining the training images comprises simulating the noise for a lower dose than the reference dose, simulating the noise for the lower dose than the reference dose comprising:
determining an intermediate image from the base image, determining the intermediate image from the base image comprising scaling according to a dose reduction factor; and
adding a noise contribution to the intermediate image, such that the training image is obtained.

10. The method of claim 9, wherein the dose reduction factor is used as the at least one second noise parameter that specifies a signal-to-noise ratio.

11. The method of claim 9, further comprising determining the noise contribution, the determined noise contribution comprising a signal-independent component and a signal-dependent component, wherein the signal-dependent component comprises a filter specifying the frequency distribution of the noise, and wherein at least one characteristic value of the frequency distribution used by the filter is used as the at least one second noise parameter.

12. The method of claim 11, wherein the predefined noise values of the at least one second noise parameter that relates to the characteristic value of the frequency distribution are selected to specify high-frequency components in the signal-dependent noise that vary in magnitude.

13. The method of claim 1, wherein different values of the result parameter are assigned to different image regions of the low-dose X-ray image,
wherein the noise reduction algorithm is applied separately for the individual image regions according to the respective values.

14. The method of claim 1, wherein the at least one trained function comprises a neural network, the result image is determined to correspond with an image acquired using the reference dose, or a combination thereof.

15. An image processing apparatus for noise reduction in a low-dose X-ray image, acquired using a lower dose than a reference dose, using a noise reduction algorithm that includes a preprocessing step for determining input data, at least one trained function for determining noise-reduced output data from the input data, and a postprocessing step for determining a result image from the output data, the image processing apparatus comprising:
a first interface configured to receive the low-dose X-ray image;
a second interface configured to receive at least one result parameter specifying at least one desired result attribute of the result image that is to be achieved by the noise reduction;
a noise reduction unit configured to determine the result image using the noise reduction algorithm, and obtain the at least one desired result attribute, the obtainment of the at least one desired result attribute comprising:
modification of the preprocessing, such that a noise value of at least one first noise parameter that specifies a first noise attribute is set, the noise value being determined from one or more of the at least one result parameter, wherein the noise value is selectable to differ from a reference value of the at least one first noise parameter that specifies a first noise attribute defined for the training data for training the at least one trained function;
set, according to one or more of the at least one result parameters, of the at least one trained function to one of a plurality of predefined noise values of at least one second noise parameter that specifies a second noise attribute, that were set for training data used to train the at least one function, wherein the one noise value of the at least one second noise parameter for setting the at least one trained function is selectable to differ from a noise value of the at least one second noise parameter that prevails in the low-dose X-ray image; or
a combination thereof; and
a third interface configured to output the result image.

16. In a non-transitory computer-readable storage medium that stores instructions executable by one or more processors for noise reduction in a low-dose X-ray image, acquired using a lower dose than a reference dose, using a noise reduction algorithm that includes a preprocessing step for determining input data, at least one trained function for determining noise-reduced output data from the input data, and a postprocessing step for determining a result image from the output data, the instructions comprising:
receiving or determining at least one result parameter specifying at least one desired result attribute of the result image that is to be achieved by the noise reduction; and
obtaining the at least one desired result attribute, obtaining the at least one desired results attribute comprising:
modifying the preprocessing, such that a noise value of at least one first noise parameter is set, the at least one first noise parameter specifying a first noise attribute, the noise value being determined from one or more of the at least one result parameters, wherein the noise value is selectable to differ from a reference value of the at least one first noise parameter, the reference value specifying a first noise attribute defined for the training data for training the trained function;
setting, according to one or more of the at least one result parameters, the at least one trained function to one of a plurality of predefined noise values of at least one second noise parameter that specifies a second noise attribute, that were set for training data used to train the at least one trained function, wherein the one noise value of the at least one second noise parameter for setting the at least one trained function is selectable to differ from a noise value of the at least one second noise parameter that prevails in the low-dose X-ray image.

17. The non-transitory computer-readable storage medium of claim 16, wherein the instructions further comprise determining an input image of the input data, the determining of the input image of the input data comprising implementing a noise variance stabilization transform in the preprocessing step,
wherein the reference value is a reference variance of noise after the noise variance stabilization transform, and
wherein a noise variance value of the noise after the noise variance stabilization transform is used as the noise value of the at least one first noise parameter, the noise variance differing from the reference variance.

18. The non-transitory computer-readable storage medium of claim 17, wherein the at least one desired result attribute includes a strength of the noise reduction, and
wherein a noise variance value greater than the reference variance is used for a lower strength of the noise reduction, and a noise variance value less than the reference variance is used for a higher strength of the noise reduction.

* * * * *